3,260,327
SHORT WAVE SEISMIC PULSE RADIATOR
Burton McCollum, Houston, Tex.; P. R. Rowe and Bank of the Southwest National Association, Houston, executors of said Burton McCollum, deceased
Filed Feb. 6, 1963, Ser. No. 256,560
15 Claims. (Cl. 181—.5)

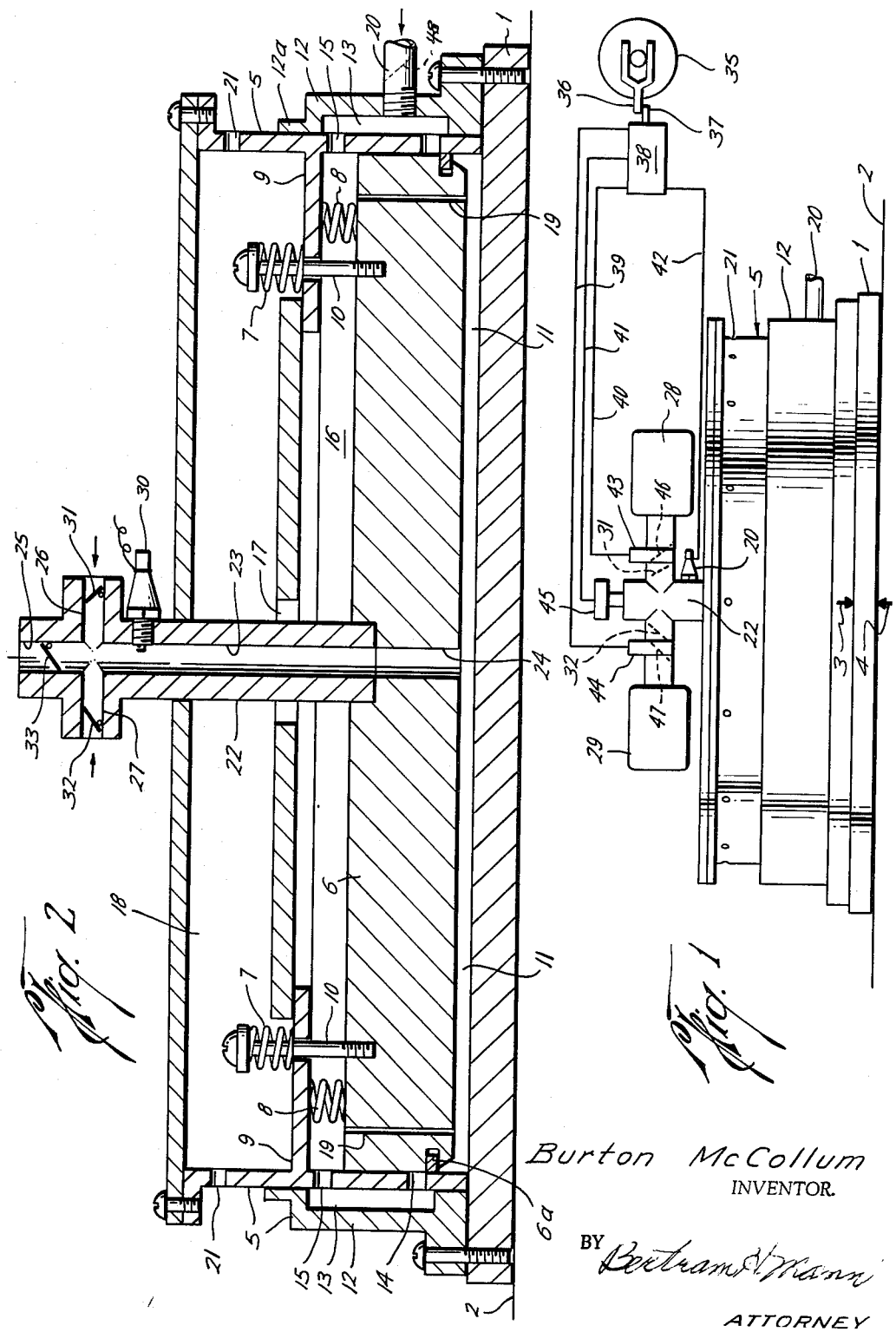

The seismic exploration industry is fully aware of the urgent need of a system in which the overall duration of the reflected events is very short. The obvious reason for this is that the shorter the duration of the events, the less interference will be encountered between reflected events from closely spaced horizons. In conventional practice at the present time, the wave lengths usually range between twenty and forty milliseconds. Since the entire event in a typical, well damped system, as usually recorded, comprises about one and one half wave lengths, the overall duration of the reflected event from any particular horizon will usually range between thirty and sixty milliseconds. The average velocity of elastic waves in the ground may vary from a few thousand to over fifteen thousand feet per second. If we take an average of, say, ten thousand feet per second it follows that, on the average, reflecting horizons have to be from two hundred to three hundred feet apart if the reflected events are not to overlap. As a rule, geophysicists are interested in mapping horizons much closer together than this. In particular it is very important to be able to map stratigraphic traps by reflections from the top and bottom of the stratum under study, and this requires the separation and recognition of reflected events that are at most separated by only a few milliseconds. This, and many other exploration problems require for their solution that the overall duration of reflected events be as brief as possible. Many attempts have been made with this objective in view. However, these attempts have been greatly handicapped by an erroneous concept that has long been prevalent throughout the geophysical profession. In the early years of seismic exploration, particularly before filters were used, it was often observed that reflections from deep horizons were of much longer wave lengths than those from shallow horizons. This observation led to the belief that a seismic pulse always becomes progressively longer with travel time. In due course, prominent workers in this field developed mathematical concepts purporting to show that the wave length of a seismic pulse must, of necessity, increase its wave length in direct proportion to the square root of the travel time. This, if true, would preclude the possibility of developing a short wave seismic exploration system based on the radiation of brief seismic pulses. Consequent to this prevailing belief, numerous workers in this field have experimented with the use of wave trains of various types. These attempts have met with a certain measure of success but, to date, they have involved elements that seriously limit their utility. I have made extensive researches on this problem and have found that the above mentioned concepts relating to the increase in wave length with travel time are wholly unsound. I have been able to prove that any seismic pulse, however short it may be at the instant of radiation, maintains its wave length unchanged no matter how long or how far it travels from the surface of the earth. This opens up entirely new avenues of approach to the problem of developing a short wave seismic exploration system. The invention described below exploits this new concept.

Before proceeding to describe the techniques embraced in my invention, a brief discussion of the major problems involved in the utilization of short waves, is in order. The portions of the earth with which we have to deal are almost always sedimentary deposits and these have widely varying characteristics depending on the geologic age and local conditions under which the sedimentation occurred. In many areas, depth is also an important variable, this being true particularly in the younger deposits, such as the miocene and more recent sediments. Generally, the older and more compact sediments have much better elastic properties than those of lesser age. The miocene and recent deposits are usually characterized by poor elastic properties, while the near surface sediments, including what is commonly called the weathered layer, often exhibit extremely poor elastic properties. The characteristic velocities of these shallow horizons are generally low and the absorption of the wave energy is very high, particularly in the shorter wave lengths. It is this latter property of high absorption that is one of the key factors in seismic exploration by short waves.

It has long been known that sedimentary formations, particularly the less consolidated ones, not only absorb wave energy at a high rate, but this rate is a very sensitive function of the wave length of the radiated energy, the shorter wave lengths being absorbed at a much higher rate than the longer waves. Some experiments have been reported showing that the intensity of the signals at any specified distance from the source, and having the same initial amplitude, varies inversely according to an exponential law, exponents of the order of 3 and 4 having been reported. Therefore, if a seismic wave is made up of a plurality of components of different wave lengths, the shorter wave lengths will be absorbed much more rapidly than the longer waves. Seismic pulses as usually generated, are a composite of a plurality of wave lengths. During the earlier portion of the travel time the shorter wave lengths may predominate, while later only the longer wave lengths will survive to any important degree, thereby giving a superficial appearance of a progressively increasing wave length with travel time. I have made extensive experiments on the propagation of monochromatic seismic pulses, and have found that the wave lengths of such pulses are invariable with travel time. These conclusions have been borne out by a massive accumulation of records of reflected events from horizons at depths varying from a few hundred feet to many thousands of feet.

From the foregoing it is evident that a prime requisite for a short wave system is a radiator capable of radiating a very large percentage of its energy in the form of a monochromatic pulse of the desired wave length. This objective has been achieved in the devices described below.

One of the key elements of my invention is a seismic radiator capable of radiating an unusually large percentage of its vertically traveling energy in a close approximation to a monochromatic pulse of any predetermined wave length. Basically, it is a mechanical device, coupled elastically to the earth. It may be actuated by any means that imparts to the radiator a force having a sufficiently high rate of buildup, and a sufficiently short duration. I have used successfully for this purpose, electrodynamic and hydraulic drives, and also a detonating mixture of gases to generate the impact. The description which follows relates to the particular type in which the initial impact is generated by the detonation of a suitable gas mixture.

In the accompanying drawings which illustrate the invention,

FIG. 1 is a schematic representation of the basic elements involved; and

FIG. 2 is a vertical center section of a seismic radiator embodying the invention.

The herein disclosed apparatus, as illustrated in FIG. 1, comprises a base plate 1, elastically coupled to the earth 2, as hereinafter described, to serve as the transducer, or radiating element. If we impart to the base plate 1 a sudden impact symbolized by the arrow 3, the duration of the radiated wave will, to a considerable degree, be a function of this duration of the impact. However, other factors, such as the momentum of the base plate and any masses connected thereto, and the physical properties of the transmission medium such as the earth in the immediate vicinity of the radiator will also have a bearing on the duration of the signal radiated. Because of these factors the duration of the radiated wave will usually be greater than the duration of the impact 3. Therefore, in order to have proper control of the dominant wave length, I have found it necessary to impart to the base plate 1, a second impact, symbolized by the arrow 4, which is opposite in direction to the initial impact 3. The time interval between these two impacts will usually be substantially less than the desired duration of the radiated wave.

The actual radiator used in a practical embodiment of my invention is a cylindrical device shown in section in FIG. 2. Here we have the base plate 1 for coupling to a medium 2 for transmission of wave energy and to serve as the radiating element. A housing 5 is fixed to the base plate 1, and inside the housing is an inertia mass 6 provided with a piston ring 6a, movable in limited degree inside the housing in the manner of a piston in a cylinder. This piston is supported and normally held in proper position by springs 7 and 8 mounted on either side of a rigid partition structure 9, the springs 8 being preferably much stronger and more rigid than springs 7. Bolts 10 project from weight 6 slidably through partition structure 9 and their heads normally rest on compression springs 7 and directly support weight 6. Springs 7 also serve to hold the weight in firm contact with the springs 8, so as to maintain a proper spacing in firing chamber 11 between the inertia mass 6 and the base plate 1. Another function of the springs 8 will be disclosed later.

Housing 5 includes the cylindrical wall forming the working chamber within which weight 6 reciprocates. An outwardly projecting portion 12 is secured to the housing by means of a bolted or welded flange 12a and forms annular exhaust space 13 communicating through lower and upper exhaust ports 14 and 15, respectively, with the lower, firing chamber part 11 of the casing and muffler chamber 16 between the weighted piston and partition 9. A central aperture 17 in the partition freely connects chamber 16 with additional muffler space 18 in the top of housing 5. Small vertical ducts 19 in weight 6 connect chambers 11 and 16 for a purpose to be described. An apertured boss or pipe 20 connects exhaust space 13 to a source of compressed air for the admission of cooling air and small exhaust vents 21 are provided in the wall of space 18.

A tubular member 22 is sealingly secured to the center of weight 6 with its duct 23 in line with an axial orifice 24 in weight 6. Duct 23 opens upwardly to atmosphere, as at 25. Fittings 26 and 27 opening sidewardly into duct 23 provide for connection of gas and oxygen supplies of tanks 28 and 29 to form the combustible mixture. A spark plug 30 also is mounted in housing 22. Check valves 31 and 32 in the fittings prevent back firing therethrough. A check valve 33 is provided in air inlet 25.

FIG. 1 shows schematically a recorder drum 35 of any well known type which records earth movements applied to a detecting transducer (not shown), some of which may have been reflected from subsurface formation boundaries. Secured to the drum in a manner to rotate therewith is an element, as an arm 36, which actuates a timer lever 37 in desired synchronism with the recorder. Lever 37 controls a timing device 38 which, by means of wires 39, 40, 41 and 42, and suitable solenoids 43, 44, and 45 actuate valves 46 and 47, which control the supply of fuel and oxygen (or air) as from pressure bottles 28 and 29, spark plug 30, and check valve 33.

In order to be effective in generating short waves, the pressure buildup in the firing chamber 11 must be virtually instantaneous at all points, so that only a gas mixture capable of being detonated, i.e., producing a very rapidly moving pressure front, or shock wave, rather than an explosion relying mostly on expanding gases for force production, will suffice for this purpose. Any of a number of hydrocarbon gases mixed with a proper amount of oxygen is satisfactory. Hydrocarbons like propane and butane, or mixtures of the two have been found very desirable. Such a detonating mixture was first used by me in connection with my invention covered by U.S. Patent No. 2,766,837, issued October 16, 1956. In my present invention the detonating mixture is used as the main charge instead of as an auxiliary detonator. In order that the entire charge may be detonated in the shortest possible time, ignition is preferably started near the central point of the detonating chamber, i.e. at the outlet of mixture orifice 24, in a manner to be described later. Preferably the detonating chamber 11 should have as small a height as possible consistent with the impact force required, in order to conserve oxygen and prevent unnecessary heat generation and exhaust noise.

When the charge is ignited, the full force of the resultant detonation is applied to the base plate 1, and thence to the earth, or other transmission medium thereby producing a positive impact downward, to generate the first part of the dominant seismic wave. The pressure of the detonation is also applied to the inertia mass 6 which is free to move upward as a piston, within limits defined by the stiffness of the springs 8. Since we wish that the seismic wave be of very short duration, it may be desirable to limit the duration of the period of pressure on the base plate to substantially less than the period of the desired seismic wave. Provision must therefore be made for quick venting of the detonated gases at a predetermined time, and it is desired that the release of pressure be as nearly instantaneous as possible, after the venting begins. In order to accomplish this, a very large venting area must be provided and provision must be made whereby virtually no venting will occur prior to the desired time, but as soon as venting starts the vent opening will become very large after only a very brief travel of the inertia mass 6. I prefer to accomplish this by providing a large number of exhaust ports 14, around the periphery of the housing 5. These ports should preferably be rectangular, particularly at the base, since it is obvious that the rate of enlargement of the ports will be a maximum with such a contour. It will be seen that as soon as the inertia mass 6 has moved upward a very short predetermined distance, the piston ring 6a will pass the base edges of the ports 14, and as the piston ring moves a little farther all of the ports will be opened simultaneously in a very brief period of time, thereby venting the detonated charge through the annular space 13 and the vent openings 15 which completely surround the housing 5, and thence into the muffler chambers 16 and 18. The muffler chambers have a volume much greater than the detonation chamber 11, so that the gases are greatly expanded and the pressure correspondingly reduced after which the products of the detonation pass out slowly through the relatively small vents 21.

After the detonated gases have been vented, as described above, the pressure against the base plate will have been relieved, but by virtue of the downward momentum of the base plate and those portions of the earth or other transmitting medium immediately adjacent thereto, there will persist a continued application of downward pressure, which if not immediately relieved will result in prolonging the first positive phase of the dominant radiated wave, and thereby increasing the dominant wave length beyond desirable limits. In order to avoid this, a counter force may be set up, as above indicated. This might be accomplished by detonating a second charge immediately above the inertia mass 6, but I prefer an alternative arrangement as illustrated in FIG. 2. This function is here performed by the springs 8, of which there are a large number stationed between the inertia mass 6 and the partition structure 9. As the inertia weight 6 moves upward following the detonation of the charge, the springs 8 are put under strong stress which imparts an upward thrust to the base plate 1, through the housing 5. This upward thrust lags behind the downward impact resulting from the detonation of the charge, and persists for a very brief interval after the detonated gases are vented. If the dimensions and constants of the springs 8 are properly proportioned with respect to the force of the detonation and the mass of the inertia weight they can be made to terminate the positive seismic impulse in any predetermined manner. By properly proportioning all of the elements above described, the entire impact cycle can be completed within any predetermined period of time. Thus with proper design, the principles hereinabove described make it possible to radiate short, vertically traveling pulses, that, for all practical purposes, are virtually monochromatic, which makes possible seismic records of much greater clarity than it has heretofore been possible to achieve.

In order to avoid the necessity of building and handling a very large unit for generating the waves, it will usually be desirable to use a small unit and repeat the operation a large number of times, the successive records being integrated into a final composite having sufficient amplitude to override random noise. It is therefore desirable that the operating cycle be repeatable as often as possible. There is set out below an operating cycle which has proven successful. It is described here as typical of numerous optional procedures which may be used.

A suitable gaseous fuel is sent into intake fitting 26, and oxygen is admitted through the intake 27. These streams join in the duct 23, forming the mixing tube and preignition chamber, and travel down through orifice 24 in the piston to the center of the detonating chamber 11, thence radially outward, driving ahead any air or residual gases already in the detonating chamber. It is best to inject for each cycle a volume of detonating mixture somewhat greater than the volume of the detonating chamber 11, to insure a good detonating mixture at all points in the chamber. The undesired gases driven out ahead of the charge, pass through the small ducts 19 into muffler chambers 16 and 18 and out through small ports 21. Vents 19 are made small enough so that they do not cause any serious loss of pressure in the detonating chamber, during the time between detonation and normal venting of the charge, as above described. As soon as the detonating chamber is properly charged, the intake fittings 26 and 27 are automatically closed by their control valves 46 and 47 and the charge is ready to be fired automatically by a firing trigger of conventional type as 36 in FIG. 1, synchronized with the recording element 35 of any suitable recorder, preferably of the magnetic type. The firing trigger fires the spark plug 30, which detonates the mixture in the duct 23, whereupon the detonation wave passes down the duct and in turn detonates the main charge at the center point of the firing chamber 11. The entire charge is then detonated within a small fraction of a millisecond, which, for practical purposes is virtually instantaneous. Immediately after the detonation occurs, check valve 33 automatically opens to admit a noncombustibe gas under pressure through the intake 25, to flush the hot residual gases out of the detonation chamber. The radiator is then ready to receive a second charge for a repetition of the cycle. The combustible element valves 46 and 47 may be actuated in any suitable way, as by means of timing device 38, which controls the valves 43 and 44.

After each operating cycle it is desirable to flush out the muffler compartments 16 and 18, to prevent overheating. This can best be done by passing a continuous flow of air through the cool air intake 20, preferably from a source of air under pressure. The air flow is preferably made continuous so as to need no automatic controls. This flow of air also performs the additional important function of preventing accumulation of an explosive mixture of gases in the muffler compartments during the charging portion of the cycle. Optionally, a blower driven by any suitable motor may be installed in or near the muffler chamber 16. Check valves shown symbolically at 31, 32, 33, and 48 prevent the detonation pressure from getting back into the supply lines.

In the use of the above described radiator it is important that the radiator base be always in good elastic contact with the earth. This statement applies to any seismic radiator regardless of the means used to actuate the radiator. I prefer to achieve this objective by utilizing the principles set out in my co-pending application Serial No. 2,255, filed January 13, 1960, now Patent No. 3,182,743, which discloses certain principles herein claimed.

As explained, any suitable means may be provided for timing the pressure impulse set up in the radiator, both as to initiation and duration. The weight and dimensions of the inertia member, the size of the firing chamber, the positioning of the exhaust ports 14, the constants of springs 7 and 8, the timing, and the character and quantities of the combustible charge all affect the nature of the seismic wave produced and, therefore, will be adjusted to achieve desired results. Also, the radiator may be reversed so that the negative impulse is applied to the ground first and is followed by the positive impulse. The invention may be modified in these and other respects as will occur to those skilled in the art, and the exclusive use of all modifications as come within the scope of the appended claims is contemplated.

I claim:

1. A device for radiating seismic waves in substantial proportion of predetermined wave length comprising a casing having a bottom for coupling with a wave energy transmitting medium, an inertia member reciprocable in said casing and forming a firing chamber therein, means for causing a detonation in said firing chamber to apply an impulse to said casing and the coupled medium and propel said inertia member in one direction, and reaction means between said member and said casing and disposed to be actuated by said member upon movement thereof in said direction to apply to said casing a second impulse opposite in sense to said first impulse and thereby substantially damp the effect of said first impulse upon said casing and the coupled medium.

2. A seismic radiator as described in claim 1 in which said reaction means comprises spring means positioned to be stressed upon movement of said inertia member in said first direction to apply said damping impulse to said casing a predetermined time after said first impulse.

3. A seismic radiator as described in claim 1 further including exhaust porting in said casing adapted to be opened during the movement of said inertia member in said first direction to release the explosive pressure thereon at a predetermined time interval after initiation of said first impulse.

4. A seismic radiator as described in claim 2 further including stop means limiting movement of said inertia member in the opposite direction for adjusting the normal vertical dimension of said firing chamber.

5. A seismic radiator as described in claim 4 in which said stop means comprises spring means normally supporting said inertia member.

6. A seismic radiator comprising a casing with a wave energy transmitting wall, an inertia member vertically reciprocable in said casing and forming a firing chamber therebeneath, means to introduce explosive material into said chamber and to ignite said material for applying an impulse in one direction to said casing and propelling said inertia member in the opposite direction, reaction means between said inertia member and said casing for engagement by said inertia member to apply an impulse to said casing in said opposite direction, a muffler chamber in said casing adjacent said inertia member, and exhaust porting in the wall of said firing chamber in communication with said muffler chamber.

7. A seismic radiator as described in claim 6 in which the exhaust porting in said firing chamber wall is positioned to be swept by said inertia member and to connect said firing and muffler chambers a predetermined interval after initiation of said impulse.

8. A seismic radiator comprising a casing having a wave energy transmitting bottom, an inertia member reciprocable in said casing and forming a firing chamber in the lower part thereof, intake ducting extending through said inertia member and said casing, said intake ducting comprising a tubular member secured to the top of said inertia member and extending through the casing wall and connections for combustible gases leading into said tubular member, means for supplying metered quantities of combustible gases to said ducting, and means for igniting said gases to apply an impulse to said casing and the ground.

9. A seismic raidator as described in claim 8 further including check means in said connections for preventing backfiring therethrough.

10. A seismic radiator as described in claim 8 in which said ducting opens substantially into the center portion of said firing chamber.

11. A seismic radiator as described in claim 8 in which said igniting means comprises a spark plug mounted on said tubular housing and said tubular housing forms a preignition chamber.

12. A seismic radiator comprising a casing having a wave energy transmitting wall, an inertia member reciprocable in said casing and forming a firing chamber therebeneath, means to supply combustible fluid material to said chamber and to ignite the same for applying radiatable wave energy of predetermined wave length to said energy transmitting wall and propelling said inertia member in said casing, exhaust means for releasing exhaust gases from said chamber susbtantially at the end of the initial positive phase of said wave energy, and restricted exhaust ducting communicating with said firing chamber in the rest position of said inertia member for releasing residue material in said firing chamber.

13. The method of generating radiant wave energy at predetermined dominant wave length for use in geophysical exploration which comprises sequentially applying to a radiating member pairs of wave producing impulses, each pair consisting of a sharp, positive impulse and a negative impulse in rapid succession.

14. The method of generating radiant wave energy at predetermined dominant wave length for use in geophysical exploration which comprises applying to the earth an isolated pair of wave producing impulses consisting of a sharp, positive impulse and a negative impulse in rapid succession.

15. The method of generating radiant wave energy having a substantial component approximating a predetermined cyclical period for use in seismic exploration which comprises planting an expansible chamber member, exploding a charge in the chamber member to radiate a sharp, positive impulse therefrom, prematurely releasing the exploded gases from said member for terminating said impulse, and immediately applying to said chamber member an impulse of opposite sense and sufficient intensity to terminate said first impulse and initiate the succeeding negative impulse.

References Cited by the Examiner
UNITED STATES PATENTS

| | | | |
|---|---|---|---|
| 2,128,742 | 8/1938 | Fuehrer | 173—134 X |
| 2,396,185 | 3/1946 | Mannerstedt et al. | 123—46 |
| 2,910,134 | 10/1959 | Crawford et al. | 181—.5 |
| 3,029,733 | 4/1962 | McElroy | 181—.5 |
| 3,072,829 | 1/1963 | McDonal | 181—.5 |
| 3,189,121 | 6/1965 | Vander Stoep | 181—.5 |
| 3,198,282 | 8/1965 | Dunaway | 181—.5 |

BENJAMIN A. BORCHELT, *Primary Examiner.*

G. H. GLANZMAN, *Assistant Examiner.*